(12) United States Patent
Fisher et al.

(10) Patent No.: US 7,093,899 B2
(45) Date of Patent: Aug. 22, 2006

(54) SEATING ARRANGEMENT WITH AN ADJUSTABLE SEATING SEGMENT

(75) Inventors: Siegfried Fisher, Leverkusen (DE); Rudolf Hemmelrath, Leverkusen (DE)

(73) Assignee: Johnson Controls GmbH, Burscheid (DE)

( * ) Notice: Subject to any disclaimer, the term of this patent is extended or adjusted under 35 U.S.C. 154(b) by 2 days.

(21) Appl. No.: 10/481,693

(22) PCT Filed: Jun. 25, 2002

(86) PCT No.: PCT/EP02/07016

§ 371 (c)(1),
(2), (4) Date: Jul. 21, 2004

(87) PCT Pub. No.: WO03/002372

PCT Pub. Date: Jan. 9, 2003

(65) Prior Publication Data

US 2004/0239167 A1    Dec. 2, 2004

(30) Foreign Application Priority Data

Jun. 27, 2001    (DE) .......................... 201 10 630 U

(51) Int. Cl.
*B60N 2/00*    (2006.01)

(52) U.S. Cl. ...................... 297/334; 297/335; 297/236; 297/188.1; 297/3

(58) Field of Classification Search .......... 297/188.08, 297/188.09, 188.1, 331, 335, 336, 234, 235, 297/236, 1, 2, 3
See application file for complete search history.

(56) References Cited

U.S. PATENT DOCUMENTS

| 4,685,729 A |   | 8/1987  | Heesch et al. |
| 5,562,331 A |   | 10/1996 | Spykerman et al. ... 297/188.16 |
| 5,720,514 A | * | 2/1998  | Carlsen et al. ....... 297/188.1 X |
| 5,911,470 A |   | 6/1999  | Aumond ..................... 297/115 |
| 5,997,083 A | * | 12/1999 | Ono et al. ............... 297/236 X |
| 6,102,463 A |   | 8/2000  | Swanson et al. ......... 296/37.15 |
| 6,386,629 B1 | * | 5/2002  | Severinski et al. ...... 297/188.1 |

FOREIGN PATENT DOCUMENTS

| DE | 19954930 C1   |   | 11/1999 |
| DE | 20006562 U1   |   | 9/2001 |
| EP | 286542 A2     | * | 10/1988 |
| EP | 0625444 A1    |   | 5/1994 |
| JP | 59156836 A    | * | 9/1984 |
| JP | 08127279 A    |   | 5/1996 |

\* cited by examiner

*Primary Examiner*—Anthony D. Barfield

(57) ABSTRACT

A seating arrangement, for a motor vehicle, with a lower upholstered seating part comprising a seating surface and a seating section with a top side which is arranged opposite an under-side. Said seating section can be guided in a displaceable manner by guiding means between a first position, wherein said seating section is lowered into the upholstered seating part and forms a section of the seating surface with the top side, and between a second position, wherein said section protrudes from the seating surface in relation to the upholstered seating part. The guiding elements are configured in such a way that when the seating section is lifted between both positions they enable a turning movement of approximately 180°, in addition to adjustment of said height so that in the raised second position, the seating section with the underside thereof is raised upwards away from the upholstered seating part.

8 Claims, 3 Drawing Sheets

SEATING ARRANGEMENT WITH AN ADJUSTABLE SEATING SEGMENT

CROSS-REFERENCE TO RELATED PATENT APPLICATIONS

This application claims benefit to International Application No. PCT/EP002/07016 filed on Jun. 25, 2002 and published in English under PCT Article 21(2); German application no. DE20110530.2, filed Jun. 27, 2001, all of which are incorporated herein by these references.

BACKGROUND OF THE INVENTION

The present invention relates to a seat arrangement, in particular for a vehicle seat, having a lower seat cushion part, which has an essentially approximately horizontal or slightly inclined seat surface, and an integrated seat segment having an upper side and an opposite lower side, the seat segment being guided moveably via guide means between a first position, in which it, recessed in the seat cushion part, uses the upper side to form part of the seat surface of the seat cushion part, and a second position, in which it is arranged raised out of the seat surface relative to the seat cushion part.

U.S. Pat. No. 5,911,470 describes a seat arrangement of this type, it being possible for part of the seat cushion part to be moved upward and rearward from a first, recessed position in order, in the second position, to form an arm support for a person sitting on the neighboring seat. For this purpose, this arm support can be raised in its rear region via levers and can be shifted to the rear, and the front region is guided via a sliding guide in such a manner that it is likewise raised and is also displaced to the rear. As a result, in the one position, the upholstered upper side of this arm support forms part of the seat surface and then, in the other position, also forms an upholstered arm rest. In addition, in the second position, two holders for drinks cans are opened up in the region situated in front of the arm support, which has been shifted to the rear. For the transfer from the first position, which is recessed in the seat cushion part, into the raised second position, the arm support has to be grasped in its rear region using a tab fastened there and raised and then moved as a whole to the rear. This results in sequence of movements which is not very comfortable for the user because his arm has to be moved a long way to the rear. In addition, also only a relatively small amount of space is provided in the second position for securing in front of just two drink cans.

SUMMARY OF THE INVENTION

The present invention is based on the object of providing a seat arrangement of the type mentioned which ensures particularly comfortable use and an increased variability of use.

According to the invention, this is achieved by the fact that the guide means are designed in such a manner that, when the seat segment is transferred between its two position, they bring about, in addition to the offset in height, a respective inevitable turning movement through approximately 180°, so that, in the raised, second position, the seat segment points with its lower side upward away from the seat cushion part. This makes it advantageously possible to use the lower side of the seat segment either as an arm rest and/or as a table-like tray surface. In addition, the seat segment can have retaining holders for virtually any desired objects, such as drinks containers, audio and/or video equipment and/or other items, on its lower side. Virtually the entire volume within the seat segment can therefore advantageously be used as desired as a storage space.

It is furthermore advantageous if the guide means are designed as four-bar linkage mechanism, in particular with two identical sub-mechanisms, arranged parallel on both sides of the seat segment. A linkage mechanism of this type enables ergonomic kinematics which are comfortable for the user to be achieved because, for the transfer into the second position, the seat segment can be raised manually in its front region and can be moved to the rear via a curved path of movement. This can be configured in coordination with the natural sequence of movement of a person's arm, so that a very comfortable, "intuitive" movement is achieved.

The configuration of the four-bar linkage mechanism also has the effect that the lower side of the seat segment, which side can be used as a table surface and/or arm rest, is automatically raised in the inverted, second position relative to the seat surface in such a manner that this is also ergonomic and therefore comfortable for the user. An offset in height of approximately 20 cm, for example, has turned out to be favorable.

The invention is particularly suitable for a seat bench, but, in principle, is also suitable for an individual seat, it being possible for the seat segment to be easily moved from a neighboring seat if the seat region provided with the seat segment is not required for sitting. This contributes to the comfort for the person sitting on the adjacent seat in each case.

Further advantageous design features and advantages of the invention are contained in the subclaims and in the following description.

DETAILED DESCRIPTION OF EXEMPLARY EMBODIMENTS

Figure 1:
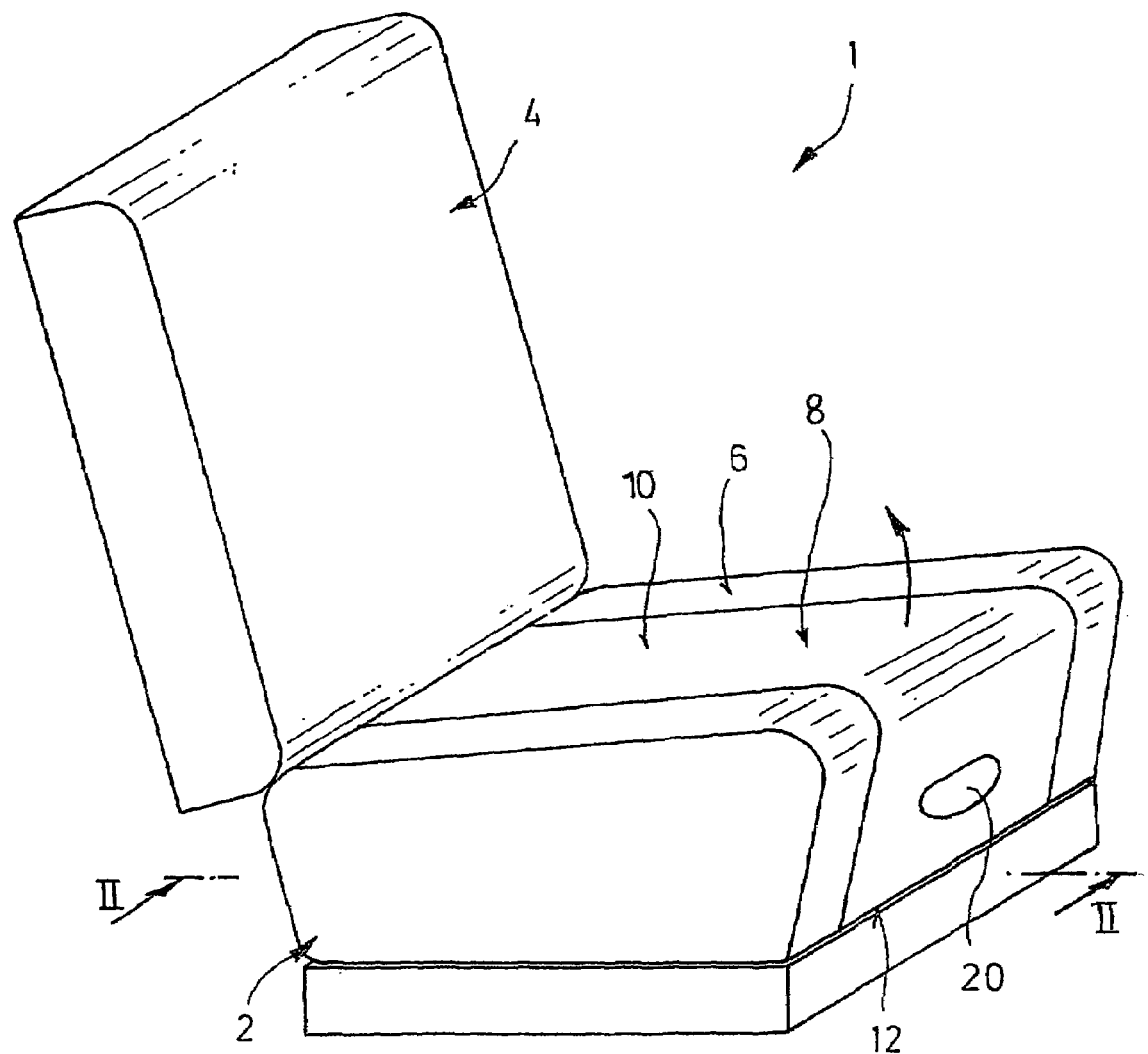
FIG. 1 shows a perspective view of a seat arrangement according to the invention.

FIG. 1 illustrates a seat 1 which is provided, in particular, for installation in a motor vehicle and comprises a lower seat cushion part 2 and a back rest 4. The seat cushion part 2 has a seat surface 6 which is essentially approximately horizontal or is slightly inclined to the rear in the direction of the back rest 4. A sub-region of the seat cushion part 2 is designed as a separate seat segment 8. In the example illustrated, the seat segment 8 extends continuously from the rear edge region, which is adjacent to the back rest 4, as far as the opposite, front edge region of the seat cushion part 2, so that the side edge regions of the seat cushion part 2, which are, in particular the same width in each case, remain on the both sides next to the seat segment 8. The seat segment 8 has an upper side 10 and an opposite lower side 12. In this case, the seat segment 8 can be transferred between two positions. In a first position according to FIGS. 1 and 2a, it is recessed in the set cushion part 2. In a second position (FIG. 2e), the seat segment 8 is moved out of the seat cushion part 2 and is arranged raised relative to the seat surface 6. In order to be able to move the seat segment 8 between these positions, the invention provides guide means 14 in such a manner that, when the seat segment 8 is transferred between its two positions, in addition to the offset in height, a respective inevitable turning movement through approximately 180° is brought about, so that, in the raised, second position according to FIG. 2e, the seat segment 8 points with its lower side 12, which is then situated approximately horizontally, upward away from the seat cushion part 2. The lower side 12 of the seat segment 8 preferably forms a table-like tray surface, but may also be used as an arm rest (arm support).

Moreover, it is expedient if the seat segment 8 has retaining holders (which cannot be seen in the drawing), in particular receiving depressions, for objects, such as, for example, drinks containers, audio and/or video equipment and/or other items, on its lower side 12.

According to the invention, in its second position, the seat segment 8 is arranged with the lower side 12 at an ergonomic height h above the seat surface 6 in such a manner that this is comfortable for the user sitting on the neighboring seat to use as an arm rest and/or to gain access to the table surface or the retaining holders. An offset in height h of the lower side 12 relative to the seat surface 6 of, in particular, approximately 20 cm is particularly advantageous. Consequently, the lower side 12 is offset between the two positions (FIGS. 2a and 2e) overall by a height H which corresponds approximately to the offset in height h plus the thickness of the seat segment 8.

As illustrated, the guide means 14 can advantageously be designed as four-bar linkage mechanisms with two identical sub-mechanisms arranged parallel on both sides of the seat segment 8.

Figure 2:
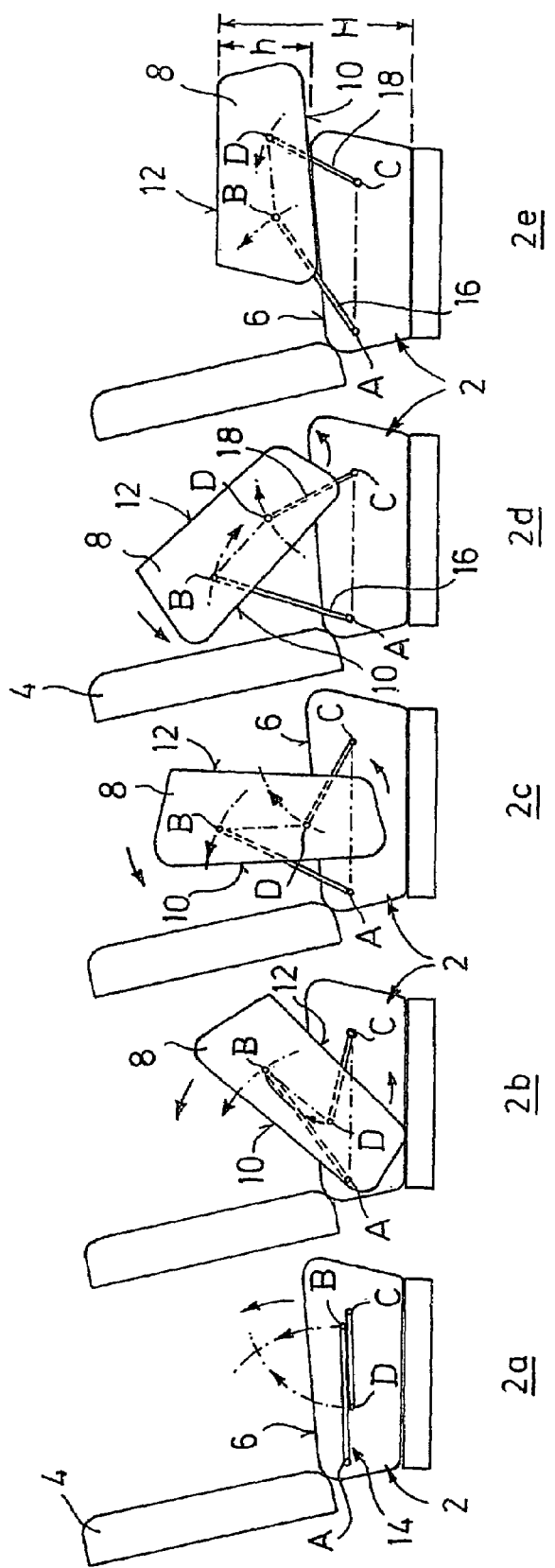
FIG. 2 shows, in a plurality of sub-illustrations 2a to 2e, in each case a schematic section in the plane II—II according to FIG. 1 in different positions during the transfer of the seat segment from the first position (2a) into the second position (2e), and, FIG. 3 shows an enlarged illustration according to FIG. 2d to further explain the preferred variant of the invention.
Figure 3:
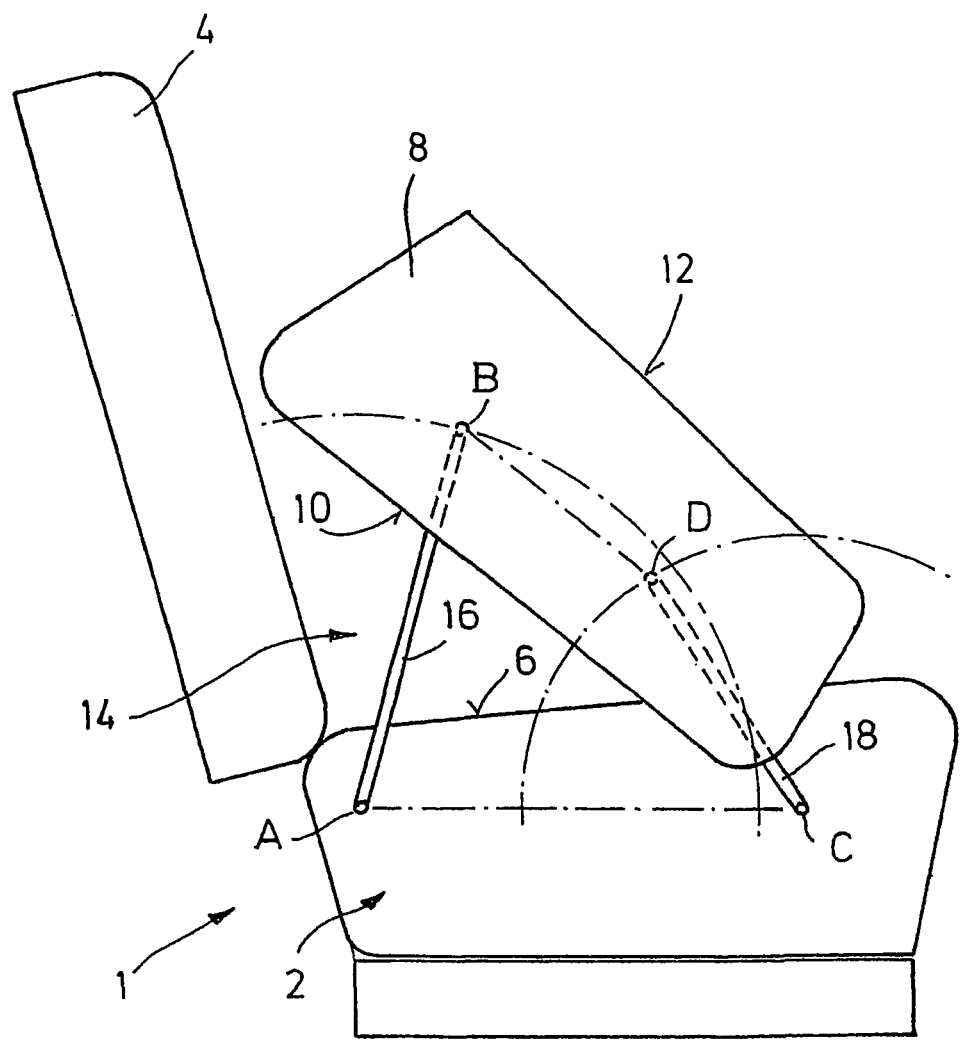

As emerges from FIGS. 2 and 3, each sub-mechanism has two levers 16, 18, each lever 16, 18 being connected pivotably on one side to the seat cushion part 2 or a supporting seat structure via a joint A or C and being connected pivotably on the other side to the seat segment 8 via a joint B or D. These four joints A, C, B, D therefore define a four-bar linkage with a base A–C formed by the seat cushion part 2, two links A–B and C–D formed by the levers 16, 18 and a coupler B–D formed by the seat segment 8. In this case, each four-bark linkage A, C, B, D is designed as a double inner link which can essentially be knocked through, the base A–C forming the largest linkage sides, and the sum of the largest and smallest linkage sides A–C plus B–D being approximately identical to the sum of the two remaining linkage sides A–B plus C–D. In addition, the linkage sides of each four-bar linkage are advantageously configured in such a manner that the transfer of the seat segment 8 from the first position into the second position takes place by means of an—in particular in the region of a front handle element 20 (which can only be seen in FIG. 1)—essentially curved movement corresponding to an ergonomic radius of action of a person's arm. It is possible to talk about an "intuitive sequence of movement". For this purpose, the following length ratios are particularly advantageous:

Base A–C: coupler B–D=approximately (1.8 to 1.9):1, in particular 1.86:1,
rear link A–B: front link C–D=approximately (1.4 to 1.5):1, in particular 1.42:1,
Base A–C: rear link A–B=approximately (1.1 to 1.15):1, in particular 1.11:1,
front link C–D: coupler B–D=approximately (1.15 to 1.2):1, in particular 1.18:1.

The seat segment 8 is, of course, locked in each case in the two abovementioned end positions of its transfer movements, specifically, in the first position, preferably by simply resting on a seat structure of the seat cushion part 2. In the second position, locking can be ensured by separate means and/or by self-locking of the linkage mechanism.

The invention is not confined to the exemplary embodiment illustrated and described, but also encompasses all variants of equivalent effect within the meaning of the invention. Furthermore, the invention is also not yet confined to the combination of features defined in claim 1 but can also be defined by any other desired combination of particular features of the all disclosed individual feature of claim 1 can be omitted or replaced by at least one individual feature disclosed elsewhere in the application. To this extent, claim 1 is to be understood merely as a first attempt at formulating an invention.

The invention claimed is:

1. A seat arrangement, for a vehicle seat comprising a lower seat cushion part (2), which has an inclined seat surface (6), and a seat segment (8) having an upper side (10) and an opposite lower side (12), the seat segment (8) is guided moveably via a guide (14) between a first position, recessed in the seat cushion part (2), to form part of the seat surface (6) of the seat cushion part (2), and a second position, raised completely out of the seat surface (6) relative to the seat cushion part (2), the guide (14) is configured in such a manner that, when the seat segment (8) is transferred between its two positions, the seat segment is completely offset in height, and turned through approximately 180°, so that, in the raised, second position, the seat segment (8) points with its lower side (12) upward away from the seat cushion part (2).

2. The seat arrangement as claimed in claim 1, wherein the seat segment (8) has a table-like tray surface on its lower side (12).

3. The seat arrangement as claimed in claim 1, the seat segment (8) has retaining holders for objects, on its lower side (12).

4. The seat arrangement as claimed in claim 1, wherien, in the second position, the seat segment (8) is arranged with the lower side (12) at an ergonomic height above the seat surface (6) in such a manner that the lower side (16) can also be used for an arm rest.

5. The seat arrangement as claimed in claim 1, wherein the guide (14) is configured as a four-bar linkage mechanisms, with two identical sub-mechanisms arranged parallel on both sides of the seat segment (8).

6. The seat arrangement as claimed in claim 5, wherein each sub-mechanism has two levers (16, 18) which are connected pivotably on one side to the seat cushion part (2) via a respective joint (A, C) and are connected pivotably on the other side to the seat segment (8) via a respective joint (B, D), the joints (A, C, B, D) defining a four-bar linkage with a base (A–C) formed by the levers (16, 18) and a coupler (B–D) formed by the seat segment (8).

7. The seat arrangement as claimed in claim 6, wherein each four-bar linkage (A, C, B, D) is configured as a double inner link which can be knocked through, the base (A–C) forming the largest linkage side and the sum of the largest and smallest linkage sides (A–C plus B–D) being approximately identical to the sum of the two remaining linkage sides (A–B plus C–D).

8. The seat arrangement as claimed in claim 7, wherein the length ratios of the linkage sides are configured in such a manner that the transfer of the seat segment (8) from the first position into the second position takes place in a curved movement corresponding to an ergonomic radius of action of an arm of a person holding a handle element (20 of the seat segment (8).

* * * * *